United States Patent [19]
Barry

[11] Patent Number: 5,697,810
[45] Date of Patent: Dec. 16, 1997

[54] METHOD AND APPARATUS FOR EMERGENCY AIRCRAFT START SYSTEM

[75] Inventor: Daniel Joseph Barry, Palm Bay, Fla.

[73] Assignee: Kaiser Aerospace & Electronics Corp., Foster City, Calif.

[21] Appl. No.: 421,818

[22] Filed: Apr. 13, 1995

[51] Int. Cl.$^6$ ............................................. H01R 11/00
[52] U.S. Cl. ................................... 439/503; 244/1 R
[58] Field of Search ............................... 439/502, 503, 439/504; 244/1 R, 53 A

[56] References Cited

U.S. PATENT DOCUMENTS

| | | | |
|---|---|---|---|
| 2,962,688 | 11/1960 | Werner | 439/320 |
| 3,466,453 | 9/1969 | Greenberg | 439/503 |
| 4,272,142 | 6/1981 | Zapf | 439/504 |
| 4,885,524 | 12/1989 | Wilburn | 439/503 |
| 4,900,270 | 2/1990 | Edwards | 439/502 |

Primary Examiner—Neil Abrams
Attorney, Agent, or Firm—Marvin H. Kleinberg, Esq.; Arant, Kleinberg, Lerner & Ram, LLP

[57] ABSTRACT

An emergency aircraft start apparatus and method utilizing a donor aircraft to provide pneumatic and/or electrical power to a disabled receiver aircraft which is unable to be started due to a failure in the receiver aircraft's starting system or to the unavailability of ground auxiliary equipment.

12 Claims, 7 Drawing Sheets

METHOD AND APPARATUS FOR EMERGENCY AIRCRAFT START SYSTEM

FIELD OF THE INVENTION

The present invention relates to aircraft maintenance equipment, and more particularly to an emergency aircraft start system that can be used in any circumstance to start the engine of a disabled aircraft by a buddy aircraft.

BACKGROUND OF THE INVENTION

Small aircraft can be started with electrical power just like an automobile. However, for a big aircraft, whether it is a jet, propeller, or helicopter, it needs air pressure to start its main engine. Therefore, there are three ways to start a big aircraft's main engine: (1) through an auxiliary power unit in the aircraft; (2) through an auxiliary air cart on the ground; or (3) through crossbleed of air pressure.

Ordinarily, an aircraft uses its auxiliary power unit to generate the required air pressure to start its main engine. Therefore, an aircraft cannot start its main engine if the auxiliary power unit is inoperable. Under this circumstance, external sources, such as auxiliary air carts, must be used to supply the required air pressure to start the aircraft's main engine.

Crossbleed air pressure is another alternative when the auxiliary power unit fails and no ground air cart is available. This is particularly important for aircraft at forward operating locations or in a remote area in military missions, especially for those aircraft with only one auxiliary power unit. By crossbleeding air pressure it is possible to save a stalled aircraft as well as missions.

Crossbleeding air pressure can also avoid the need for expensive equipment loaded in the aircraft or equipped as part of the aircraft. It can prevent an aircraft and equipment it carries from being destroyed, abandoned, or falling into the hands of an enemy. Most importantly, in military situations, it can save lives and keep a crew from being captured or killed.

The Kaiser Lightweight Buddy Start™ system of Kaiser Electroprecision is a system that enables crossbleeding air pressure from one aircraft to start the engine of another aircraft. In the Buddy Start system, a pneumatic hose is connected between a donor aircraft and a receiver aircraft, and the donor aircraft supplies the required air pressure to the receiver aircraft to start the receiver aircraft's engine. The pneumatic hose of Kaiser's Buddy Start system is a lightweight hose, which can be carried on the aircraft, and can be rolled up and stored easily. The present invention relates to a greatly improved form of the Buddy Start System.

SUMMARY OF THE INVENTION

The present invention is an emergency aircraft start system comprising, in addition to the previously used pneumatic hose assembly, an alternating current (hereinafter "AC") power cable assembly, and a direct current (hereinafter "DC") power cable assembly.

The pneumatic hose assembly is for crossbleeding air pressure from aircraft to aircraft. The electrical cables enable one aircraft to provide DC and AC power to another aircraft which makes the emergency start operation more flexible and safer.

The DC power cable assembly of the present invention includes a DC breakout cable that can be permanently installed to a battery of an aircraft before an emergency has occurred. This avoids the need for using tools during the emergency to connect or disconnect the DC cable to the battery, and makes the emergency operation more efficient.

The AC power cable assembly of the present invention includes an AC adapter cable. The AC adapter cable converts a connector of the cable assembly to another configuration that fits a corresponding connector in the aircraft. With this AC adapter cable the present invention can be used in almost any aircraft.

GENERAL DESCRIPTION OF THE INVENTION

When an aircraft or helicopter is stranded at forward operating locations or in a remote area, the risk of losing lives of its crew, equipment carried on the it, and the aircraft itself is high. In a military mission, it is critical to successfully help a disabled aircraft to start its engine as fast as possible. A pneumatic hose assembly of Kaiser's previously known Buddy Start system is capable of crossbleeding the required air pressure to start a disabled aircraft.

However, most of the equipment on the disabled aircraft will not function if it also lost its AC and DC power. AC and DC power are required to activate safety indications, communications between the pilots of the two aircraft, and communications between the pilot and crew, etc. Therefore, in order to accomplish a safe and successful emergency operation, the AC and DC cables may be essential to provided needed power to a disabled aircraft in an emergency aircraft start operation.

DETAILED DESCRIPTION OF THE INVENTION

Figure 1:
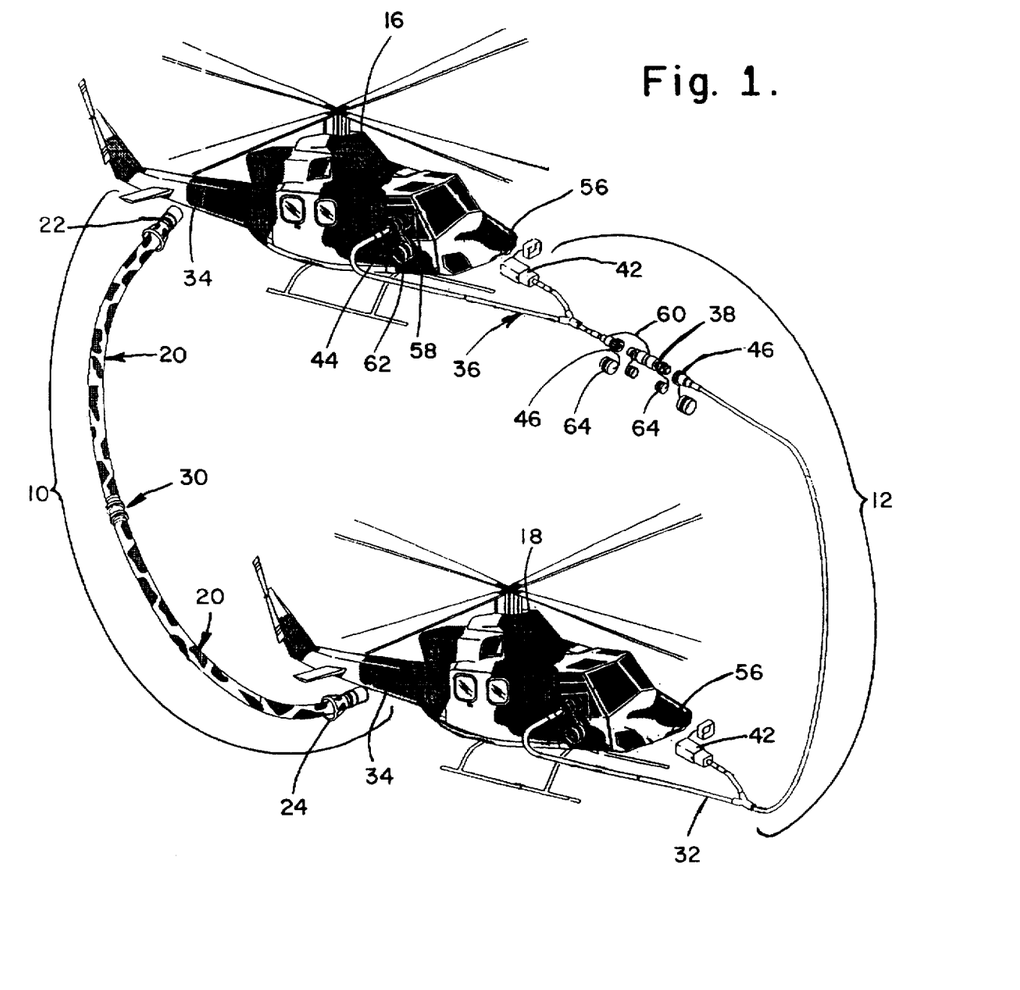
FIG. 1 is a perspective view of one helicopter crossbleeding air and providing A. C. power to another helicopter.
Figure 2:
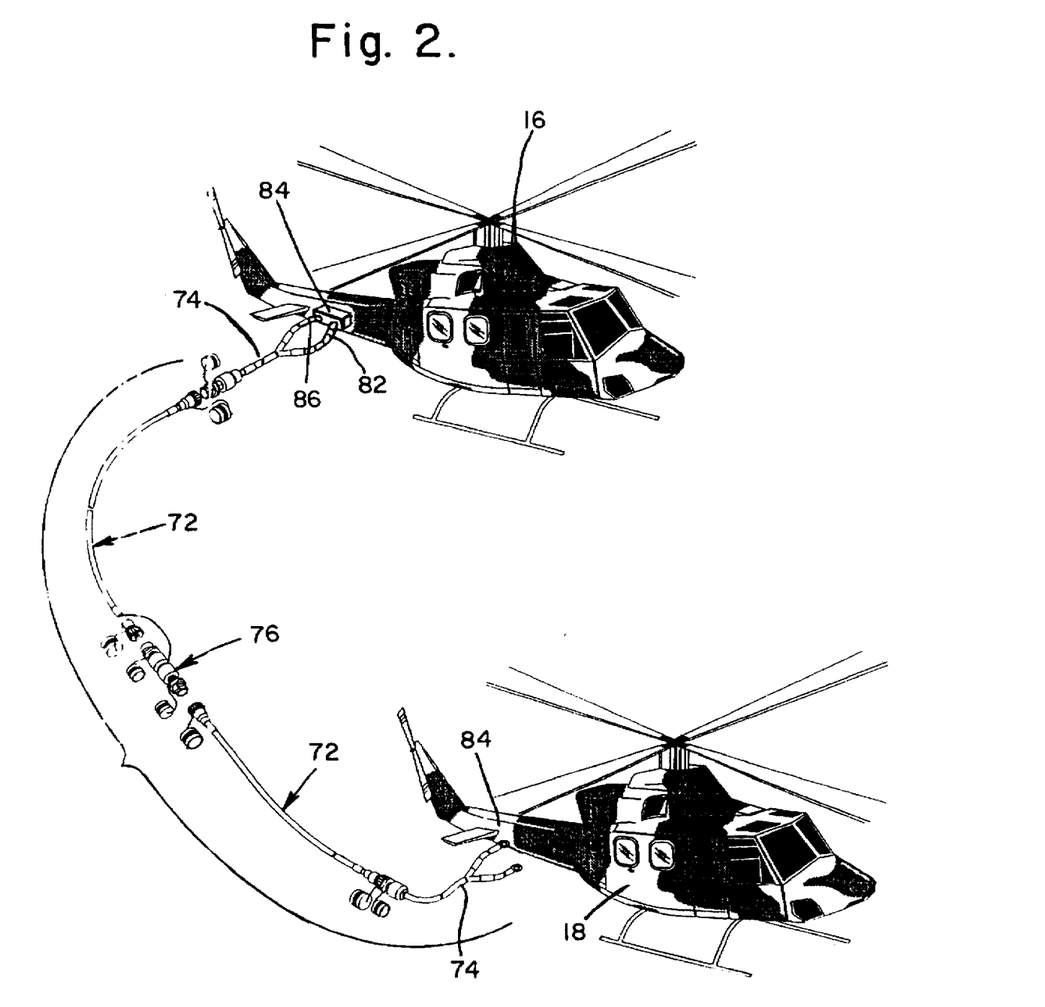
FIG. 2 is a perspective view of one helicopter providing D. C. power to another helicopter.

Turning to FIG. 1 and FIG. 2, the present invention as there shown comprises three major components: a pneumatic hose assembly 10, an AC power cable assembly 12, and a DC power cable assembly 14. It may be essential to have all the three components to carry out a safe emergency operation. In FIG. 1 and FIG. 2, the connections of the pneumatic hose assembly 10 and the two power cable assemblies are separated into two drawings for better visibility.

FIG. 1 shows the connections of pneumatic hose assembly 10 and AC power cable assembly 12 between a donor aircraft 16 and a disabled receiver aircraft 18. FIG. 2 shows the connection of DC power cable assembly 14 between the two aircraft.

PNEUMATIC HOSE ASSEMBLY

Figure 3:
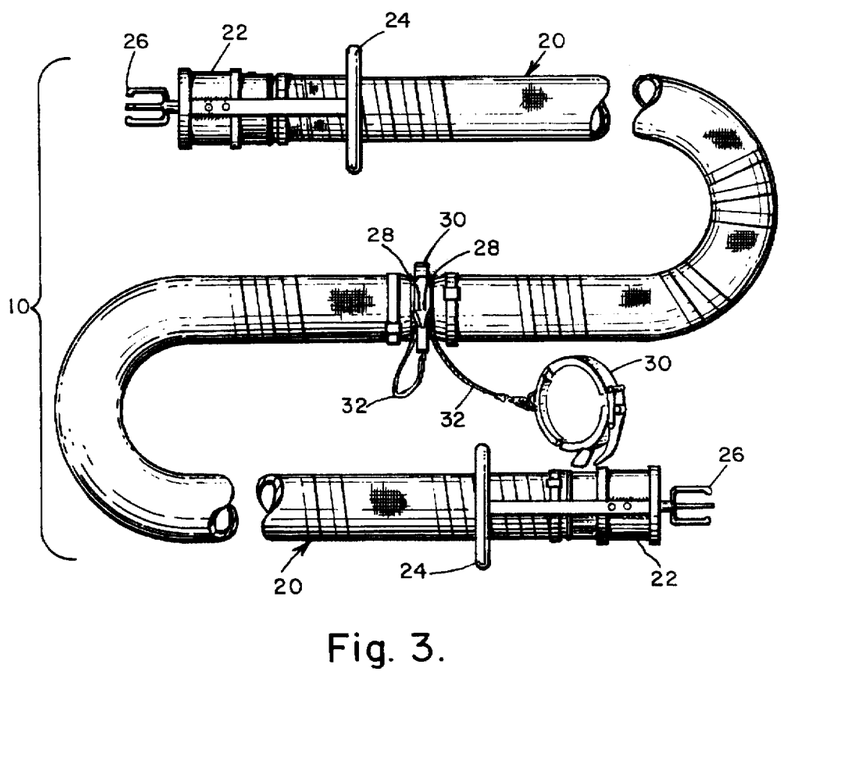
FIG. 3 is a perspective view of a pneumatic hose assembly.

Turning to FIG. 3, the pneumatic hose assembly 10 comprises two hose subassemblies 20. Each hose subassembly 20 comprises a 60-foot long, 3.5-inch inside diameter, polyamide fabric/silicon rubber hose with a full-length polyester-reinforced scuff guard; a port coupling 22 assembled with a handle 24, and a plurality of swivel probes 26 fastened to one end of the hose subassembly 20. The opposite end features a sexless coupling 28 and a clamp 30 for clamping the two hose subassemblies 20 together.

The sexless coupling 28 has identical halves which permits two hose subassemblies 20 to be clamped together with the clamp 30. The clamp 30 is tethered to the hose subassembly 20, next to the sexless coupling 28, by means of a clamp lanyard 32. Because each hose subassembly 20 is equipped with a clamp 30 and only one is needed to couple the hose subassemblies 20 together, therefore, the other clamp 30 is left unused.

CONNECTIONS OF PNEUMATIC HOSE ASSEMBLY BETWEEN DONOR AIRCRAFT AND RECEIVER AIRCRAFT

Turning to FIG. 1, the donor aircraft 16 supplies the required air pressure to start the engine of the receiver aircraft 18 through the pneumatic hose assembly 10 described above. One hose subassembly 20 is connected to the donor aircraft 16 by engaging the port coupling 22 with the aircraft external pneumatic port 34 of the donor aircraft 16. Another hose subassembly 20 is connected to the receiver aircraft 18 in the same way. A clamp 30 clamps the two hose subassemblies 20 together.

AC POWER CABLE ASSEMBLY

AC power is required to activate the hydraulic pumps, over speed sensors, internal indicators, AC lighting of an aircraft, and to display engine indications during engine starts. The AC power is also required to operate an AC reference voltage in the engine overspeed protection circuitry. A donor aircraft 16 may transmit its AC power to the disabled receiver aircraft 18 through an AC power cable assembly 12. Without AC power, the pilot of the disabled receiver aircraft 18 would have to listen to the engine of the donor aircraft 16 to determine when he could activate a start.

The preferred embodiment of the AC power cable assembly 12 of the present invention comprises two AC cables 36, an AC coupling 38, and an optional adapter cable 40.

AC CABLE

Figure 4:
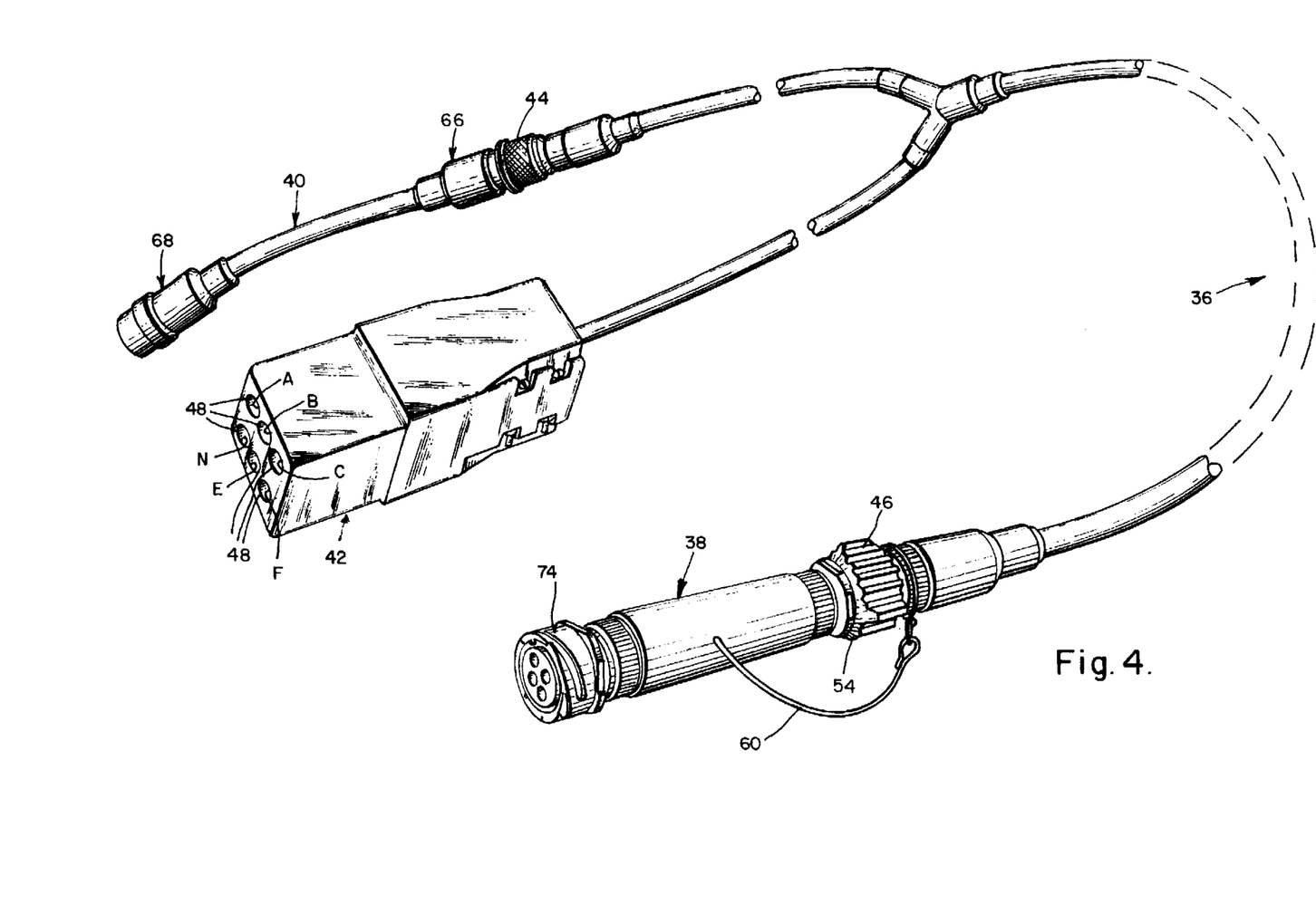
FIG. 4 is a perspective view of an AC cable assembly.

Turning to FIG. 4, the AC cable 36 is a 60-foot long cable comprising a plurality of conductors. One end of the AC cable 36 is a "Y" shaped cable. One branch of the "Y" is an AC connector box or plug 42 preferably complies with Military Specification MS25486; the other branch of the "Y" is an AC circular connector 44. A keyed AC cable connector 46 is at the single connector end and can be coupled to another AC cable 36 with an AC coupling 38. The box or plug 42 is able to be inserted into a power receptacle 56 at the aircraft 16 or 18 with which it is to be associated.

The AC cable connector 46 has four pins, identified as A, B, C and D respectively. The AC connector box or plug 42 has six sockets 48, and the size of each of the sockets 48 being different from the others. The six sockets 48 are identified as A, B, C, E, F, N respectively. The AC circular connector 44 has five pins, and can be identified as A, B, C, D and E respectively. The A socket of the AC connector box or plug 42 and the A pin of the AC circular connector 44 are jumpered together and connect to the A pin of the AC cable connector 46. The B socket of the AC connector box or plug 42, the B pin of the AC circular connector 44 and B pin of the AC cable connector 46 are jumpered together. Similarly, the C pin or socket of the respective connectors are jumpered together. The N socket of the AC connector box 42 and the D pin of the AC circular connector 44 are connected to the D pin of the AC cable connector 46. The E and F sockets of the AC connector box or plug 42 are jumpered together internally but are not connected to any other pins or sockets externally. The E pin of the AC circular connector 44 is not connected to anything.

The AC circular connector 44 described here can be made in other form or shape so that it can be adapted to other utility power receptacles on the aircraft.

ALTERNATIVE FORM OF AC CABLE

The AC cable 36 described above is a 60-foot long "Y" shaped cable. It can be in an alternative form of twice its length, i.e., 120-foot, without the AC coupling 38 and with only one AC circular connector 44 at one end and one AC connector box or plug 42 at the other. This configuration of the AC cable 36 eliminates one AC circular connector 44, one AC connector box or plug 42, and the AC coupling 38, yet still be able to accomplish what a pair of AC power cable assemblies 12 intend to accomplish.

AC COUPLING

Figure 5:
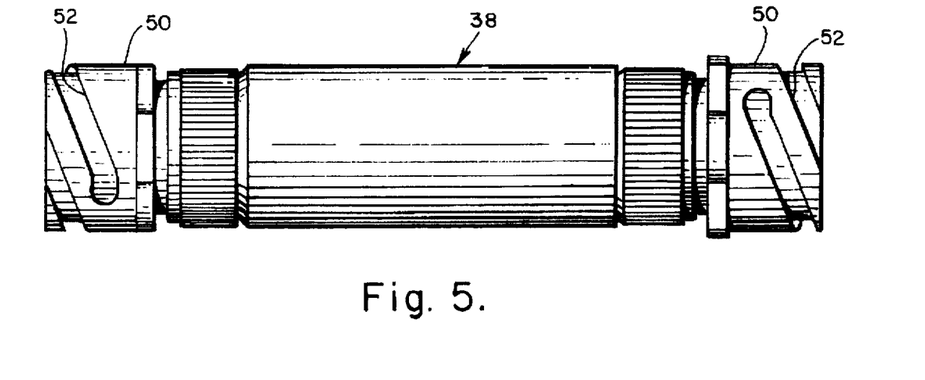
FIG. 5 is a perspective view of a power cable coupling.
Figure 5A:
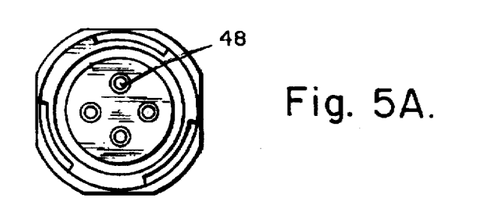
FIG. 5A is a cross-sectional view of connectors of power cable coupling.

Turning to FIG. 5, the AC coupling 38 has two identical coupling connectors 50, and can couple two AC cables 36 together. The AC coupling 38 has a plurality of conductors. As shown in FIG. 5 and FIG. 5A, the coupling connector 50 has a plurality of sockets 48 and can be connected to the AC cable connector 46.

Figure 7:
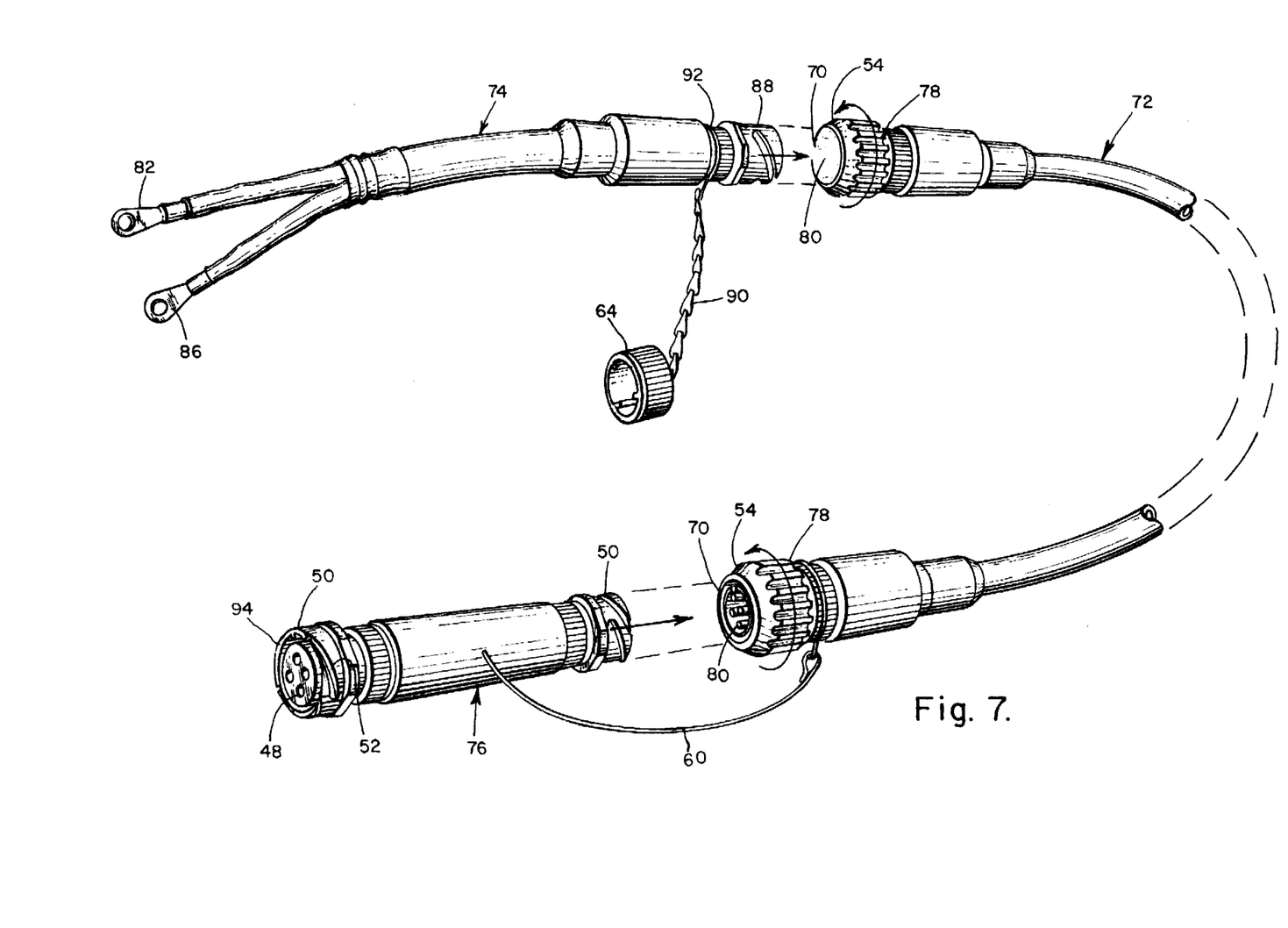
FIG. 7 is a perspective view of a DC cable assembly.

As shown in FIG. 5 and FIG. 7, the coupling connectors 50 on the AC coupling 38 has female threads 52 and can be connected to the male threaded cap 54, shown in FIG. 4, of the AC cable 36.

CONNECTIONS OF AC POWER CABLE ASSEMBLY BETWEEN DONOR AIRCRAFT AND RECEIVER AIRCRAFT

The AC power cable assembly 12 is to be connected between two aircraft. The AC connector box 42 must be connected to an external electrical power receptacle 56 of the receiver aircraft 18, and may be left unconnected to the donor aircraft 16. The AC circular connector 44 must be connected to a aeromedical kit evacuation disconnect 58 inside the donor aircraft 16, and may be left unconnected to the receiver aircraft 18. The aeromedical kit evacuation disconnect 58 is the source on the donor aircraft 16 to output AC power, therefore, the donor AC circular connector 44 must be adapted to connect to this port to supply AC power. Likewise, the external power receptacle 56 is the port where the receiver aircraft 18 receives external AC power, and thus, the AC connector box 42 must be adapted to connect to this port to receive AC power.

Two AC cables 36 are coupled together with the AC coupling 38. Each AC cable 36 is equipped with an AC coupling 38, which is physically tethered to the AC cable 36 by means of a coupling lanyard 60 so that it will always be available when needed.

The AC circular connector 44 is equipped with an AC circular connector dust cap 62 which preferably complies with Military Specification MS25CH3-18DA. All other connectors in the preferred embodiment of the present invention also have dust caps 64. The dust cap 64 keeps the connectors clean when they are not connected together connectors.

Although for convenience in illustration the AC cable 36 connected to the receiver aircraft 18 is shown as being far longer than the one connected to the donor aircraft 16, the fact is that they are preferably identical in both construction and size.

ADAPTER CABLE

Figure 6:
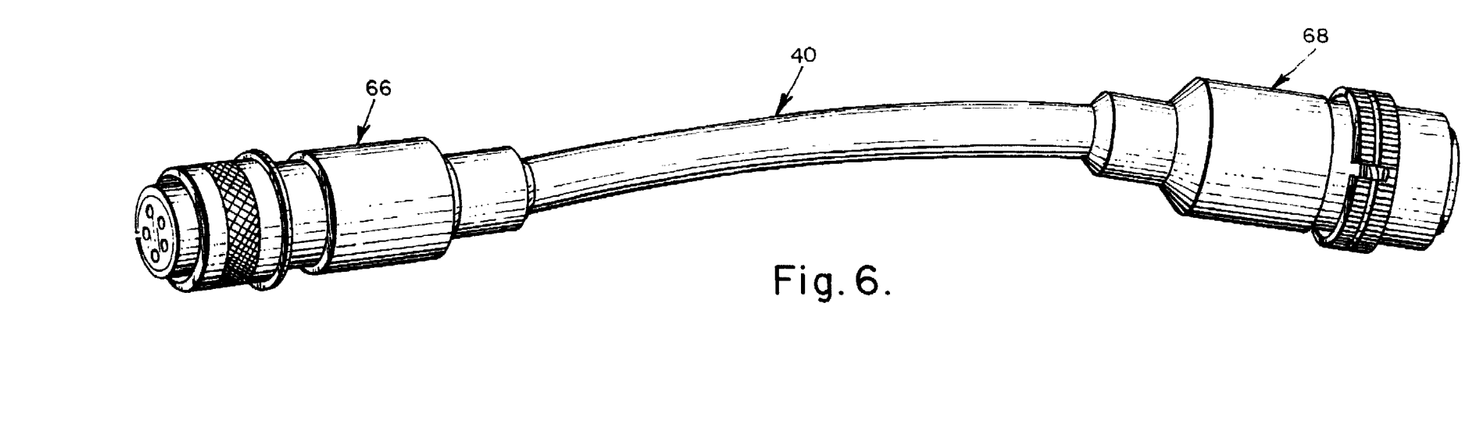
FIG. 6 is a perspective view of an adapter cable for use with the AC cable.

The preferred embodiment of the AC power cable assembly 12 of the present invention includes an optional adapter cable 40, as shown in FIG. 6, that converts the AC circular connector 44 to another configuration to fit its corresponding connector on the aircraft. Each aircraft may keep on board an AC adapter cable 40 that fits its replacement connector of aeromedical kit evacuation disconnect 58 where the AC cable 36 is to be connected to.

Figure 6A:
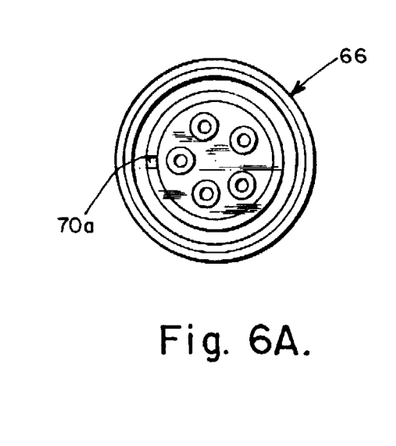
FIGS. 6A and FIG. 6B are cross-sectional views of connectors for the AC adapter cable.
Figure 6B:
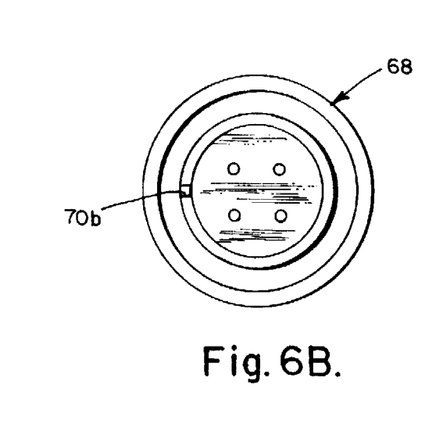

As shown in FIG. 6, FIG. 6A and FIG. 6B, the adaptor cable connector 66 to be connected to the AC circular connector 44, as shown in FIG. 4, which converts the AC circular connector 44 to a four-pin adapter port connector 68. Both connectors 66, 68 of the adapter cable 40 have key 70b and slot 70a to ensure the connections are made properly and correctly.

The adapter cable 40 described here can be made to convert the AC circular connector 44 to any number, size, or orientation, male or female, to fit its corresponding connectors on the aircraft, or other forms of utility power outlet.

DC POWER CABLE ASSEMBLY

DC power is required to activate fire detection system of the engine compartment and pilot compartment; the communication systems for aircraft internal use and for aircraft to aircraft communication; DC lighting; and engine indicators, etc. DC power is also required to energize an external power relay in order to provide AC power to the disabled receiver aircraft 18 through the external power receptacle 56. A donor aircraft 16 may transmit its DC power to the disabled receiver aircraft 18 through DC power cable assembly 14. However, if the receiver aircraft 18 is equipped with an internal transformer that can convert AC power it received from another aircraft, then the DC power cable assembly 14 to be described can be eliminated.

Turning to FIG. 2, the preferred embodiment of the DC power cable assembly 14 of the present invention comprises two DC cables 72, two breakout cables 74, and one DC coupling 76.

DC CABLE

Turning to FIG. 7, the DC cable indicated by reference number 72 is a 60-foot long cable comprising a plurality of conductors with two identical keyed DC cable connectors 78 at each end. Each DC cable connector 78 has a plurality of pins 80 and a key slot 70. The key slot 70 is to ensure that each pin is connected to its corresponding socket correctly.

BREAKOUT CABLE

The breakout cable 74 is a "Y" shaped cable. A positive lugged cable 82 of the "Y," red in color, is to be connected to the positive terminal of the battery 84 (not shown in FIG. 2) of the aircraft 18. The negative lugged cable 86 of the "Y," black in color, is to be connected to the negative terminal of the battery 84. A keyed breakout cable connector 88 is at the opposite end of the "Y," which has four sockets, marked A, B, C and D respectively. The A and B sockets are connected to the positive lugged cable 82. The C and D sockets are connected to the negative lugged cable 86. A dust cap 64 for the breakout cable connector 88 is connected to the breakout cable 74 with a dust cap lanyard 90 that is tethered to a ring 92 on the breakout cable 74 near the breakout cable connector 88.

The biggest advantage of having this breakout cable 74 is convenience, because it can be connected to the battery 84 prior to the emergency operation. As long as the breakout cable 74 is already connected to the battery 84, the DC cable 72 can easily be connected to the breakout cable 74 by fastening the DC cable connector 78 to the breakout cable connector 88 without using any tools. Otherwise, crews will need an allen wrench or hex wrench to remove or fasten the nuts on the terminals of the battery 84. Therefore, connecting the breakout cable 74 to the battery 84 prior to the emergency occurs can reduce the time required to connect the DC cable 72 to the battery 84 and will make the emergency operation more efficient and less risky.

DC COUPLING

Figure 8:
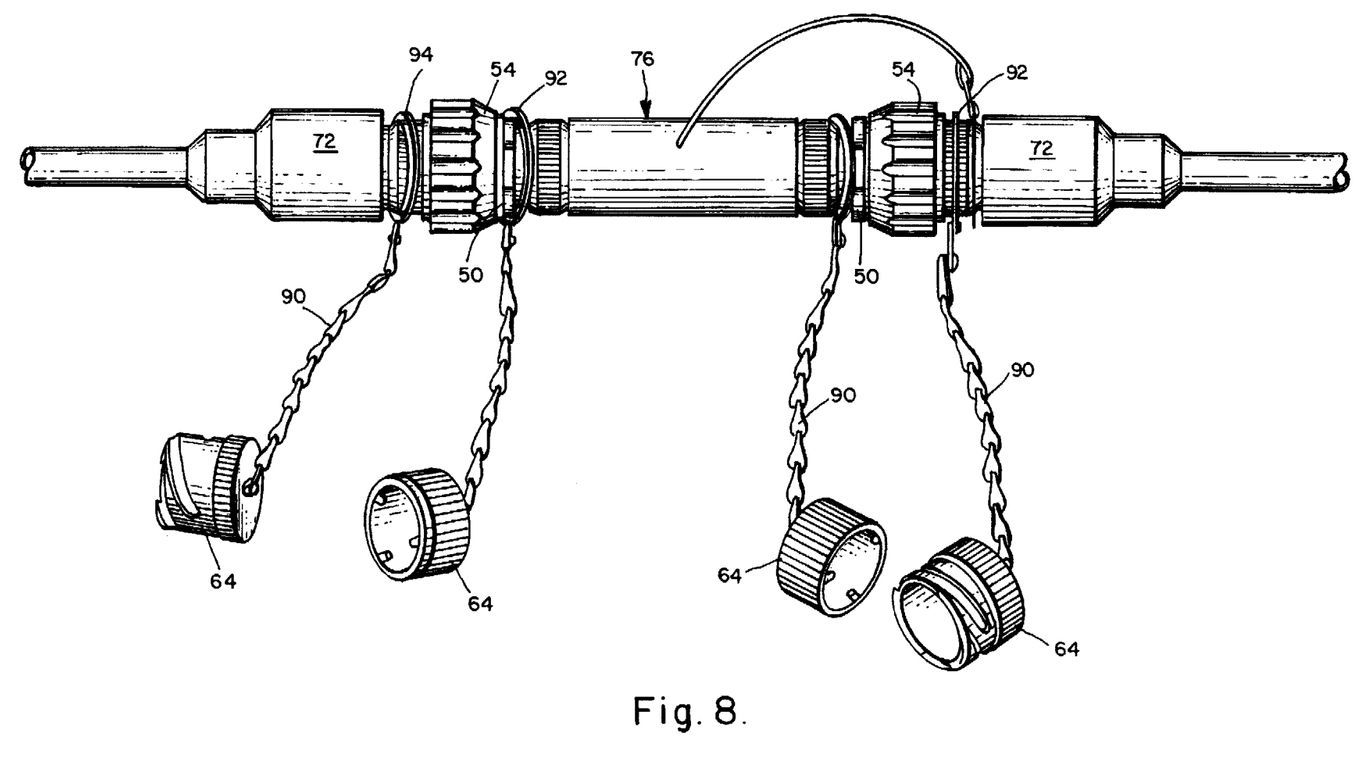
FIG. 8 is a perspective view of two DC cables or AC cables connected together by a coupling.

Turning to FIG. 8, DC coupling 76 is a coupling cable that has two coupling connectors 50 and may couple two DC cables 72 together. The DC coupling 76 is connected to the DC cable 72 through a coupling lanyard 60 that is tethered to a ring 92 next to one of the DC cable connectors 78. The DC coupling 76 has a plurality of conductors. As shown in FIG. 7, the coupling connector 50 has a key 94 and a plurality of sockets 48.

As shown in FIG. 7, the connectors 50 on the DC coupling 76 has female threads 52 that allows the male threaded cap 54 of the DC cable 72, as shown in FIG. 8, to connect to it. The DC coupling 76 also has dust caps 64 for each connector 50, shown in FIG. 8. The dust cap 64 is connected to the DC coupling 76 with a dust cap lanyard 90 tethered to a ring 92 on the DC coupling 76.

In some applications, depending upon the size of the aircraft or helicopter, the distance between the donor aircraft 16 and the receiver aircraft 18 plus the required clearance between them is greater than the length of one DC cable 72. This problem can be overcome by joining two or more DC cables 72 of the present invention together with the DC coupling 76, and consequently extending the length of the DC power cable assembly 14 to reach a desirable length.

DC coupling 76 is identical to AC coupling 38 with respect to their function and structure. Therefore, the physical description described here is applicable to AC coupling 38 with the exception that the DC coupling 76 has a bigger diameter than that of the AC coupling 38. Therefore, one cannot replace the other in actual application.

CONNECTIONS OF DC POWER CABLES ASSEMBLY BETWEEN DONOR AIRCRAFT AND RECEIVER AIRCRAFT

As shown in FIG. 2, the positive lugged cable 82 of the breakout cable 74 is connected to the positive terminal of a battery 84 of the donor aircraft 16, and the negative lugged cable 86 is connected to the negative terminal of the same battery 84. Another breakout cable 74, is connected the same way to the battery 84 of the receiver aircraft 18. Two DC cables 72 are connected to their respective breakout cable 74, and they are coupled together by a DC coupling 76.

CONNECTING TWO BATTERIES WITHOUT DC COUPLING

Two batteries 84 in two aircraft can also be connected together with only one DC cable 72 without the DC coupling 76. This arrangement can be used between two smaller aircraft or helicopters where one DC cable 72 is long enough to clear the distance between the two aircraft.

Because the DC cable connectors 78 at the two ends of DC cable 72 are identical, they can be connected to two breakout cables 74 directly. This configuration uses only one DC cable 72 and two breakout cables 74 without the DC coupling 76.

In a preferred embodiment of the invention, a fully functioning donor aircraft 16 with its engine at idle is deployed adjacent the disabled aircraft. The pneumatic hose subassembly 20 is connected to an external pneumatic port 34 of the donor aircraft 16. A second hose subassembly 20 is connected to the receiver aircraft 18 pneumatic port and the two subassemblies 18, 20 are coupled together. The AC power cable assembly 12 is connected to both aircraft as is the DC cable 72, which include the breakout cables 74, 88. When all connections are made, the receiver aircraft has a source of all electrical power required for operation.

The engines of the donor aircraft 16 can then be powered, forcing a supply of bleed air into the receiver aircraft 18 engines to start rotation. The availability of full electrical power operates all aircraft command and control systems and, in particular the fire control sensors and extinguishing equipment, should the need arise. The donor aircraft 16 then becomes the full functional equivalent of the ground air cart in the starting of the receiver aircraft's power plants.

What I claim is:

1. In an emergency aircraft start system an AC power cable assembly apparatus, comprising:

a) a three-branched AC cable having a plurality of conductors including a connector plug having a plurality of sockets at the end of one branch, a circular connector having a plurality of conductors at the end of a second branch, and an AC cable connector having a plurality of conductors at a third branch;

b) an AC coupling having a plurality of conductors tethered with a lanyard to said AC cable next to said AC cable connector; and c) said AC coupling can be adapted to connect to said AC cable connector of said AC cable at one end, and can be adapted to connect to a second AC cable connector of a second AC cable at the other end.

2. The AC power cable assembly of claim 1, further comprising an adapter cable wherein said adapter cable converts said circular connector to a second circular connector having a different plurality of pins or sockets.

3. An emergency aircraft start apparatus comprising:

a) an AC power assembly including:
      i) a first three-branched AC cable having three ends, a first of said three ends having a connector plug containing a plurality of conductors, a second of said three ends having a circular connector containing a plurality of conductors, and a third of said three ends having an AC connector means containing a plurality of conductors;
      ii) a second three-branched AC cable having three ends, a first of said ends having a connector plug containing a plurality of conductors, a second of said ends having a circular connector containing a plurality of conductors, and a third of said three ends having an AC connector means containing a plurality of conductors;
      iii) an AC coupling means having a plurality of conductors tethered with a lanyard to either of said first or second AC cables next to said AC cable connector means; and
      iv) said AC coupling means adapted to connect said first AC cable connector means with said second AC cable connector means; and b) a pneumatic hose assembly including:
      i) a first pneumatic hose having two ends, one end having a coupling means adapted for connection to said donor aircraft and the other end having a sexless coupling means;
      ii) a second pneumatic hose having two ends, one end having a coupling means adapted for connection to said receiver aircraft and the other end having a sexless coupling means; and
      iii) a clamping means for coupling said first and second hose sexless coupling means together; and c) a DC power cable assembly including:
      i) a first DC cable having two ends, one end being adapted for connection to said donor aircraft and the other end having a DC connector;
      ii) a second DC cable having two ends, one end being adapted for connection to said receiver aircraft and the other end having a DC connector; and
      iii) a DC coupling means for coupling said first and second cable DC connectors together.

4. The emergency aircraft start apparatus of claim 3 wherein each of said first and second DC cables further comprises, a three-branched cable having three ends comprising:

a) a positive voltage terminal connection means at a first of said three ends;

b) a negative voltage terminal connection means at a second of said three ends; and c) a connector with a plurality of conductors at a third of said three ends, whereby said connector is capable of separation from said respective first or second DC cable while said positive and negative terminal connections remain connected.

5. The emergency aircraft start apparatus of claim 3 wherein at least one of said first and second DC cables further comprise a coupling lanyard means for tethering said DC coupling means thereto.

6. The emergency aircraft start apparatus of claim 3 further comprising a second AC coupling means and a second coupling lanyard means for tethering said second AC coupling means next to said AC cable connector means of said first or second AC power cable not already having AC coupling means tethered thereto.

7. An emergency aircraft start apparatus, comprising:

a) an AC power assembly including:
      i) a first three-branched AC cable having three ends, a first of said three ends having a connector plug containing a plurality of conductors, a second of said three ends having a circular connector containing a plurality of conductors, and a third of said three ends having an AC connector means containing a plurality of conductors;
      ii) a second three-branched AC cable having three ends, a first of said ends having a connector plug containing a plurality of conductors, a second of said ends having a circular connector containing a plurality of conductors, and a third of said three ends having an AC connector means containing a plurality of conductors;
      iii) an AC coupling means having a plurality of conductors tethered with a lanyard to either of said first or second AC cables next to said AC cable connector means; and
      iv) said AC coupling means adapted to connect said first AC cable connector means with said second AC cable connector means; and b) a pneumatic hose assembly including:
      i) a first pneumatic hose having two ends, one end having a coupling means adapted for connection to a donor aircraft and the other end having a sexless coupling means;
      ii) a second pneumatic hose having two ends, one end having a coupling means adapted for connection to a receiver aircraft and the other end having a sexless coupling means; and
      iii) a clamping means for coupling said first and second hose sexless coupling means together.

8. An emergency aircraft start apparatus, comprising:

a) a first DC cable having two ends, one end being adapted for connection to a donor aircraft and the other end having a DC connector;

b) a second DC cable having two ends, one end being adapted for connection to a receiver aircraft and the other end having a DC connector; and c) a DC coupling means for coupling said first and second cable DC connectors together whereby the coupling of said first and second DC cables creates sufficient length to span the distance between said donor and receiver aircraft.

9. The emergency aircraft start apparatus of claim 8 further comprising:

a) a coupling lanyard means for tethering said DC coupling means to said first DC cable; and b) a second DC coupling means and a second coupling lanyard means for tethering said second DC coupling means to said second DC cable, whereby during emergency starts, one of said coupling means is coupled between said first and second DC cables while the other remains unconnected.

10. An emergency aircraft start apparatus comprising:

a) a pneumatic hose having two ends, one end being adapted to couple to intake and output pneumatic ports, and the other of said ends being a sexless connector;

b) an AC power cable having three ends, one end adapted to connect with an aircraft external power receptacle, a second of said ends adapted to connect with an aircraft utility power outlet, and a third of said ends having an AC connector attached thereto and an AC adaptor tethered thereto, whereby connection of said AC adaptor with said AC connector permits coupling of said AC power cable with a like AC power cable thereby allowing donating or receiving of AC power; and c) a DC power cable having at least two ends, one end adapted to connect to an aircraft DC power system and the other of said ends having a DC connector attached thereto and a DC adaptor tethered thereto, whereby connection of said DC adaptor with said DC connector permits coupling of said DC power cable with a like DC power cable thereby allowing donating or receiving of DC power.

11. A method of interconnecting the DC electrical systems of two aircraft in an emergency aircraft start operation, where a donor aircraft rescues a stalled receiver aircraft, comprising the steps of:

a) selecting a first DC breakout cable and connecting said cable to a battery in said donor aircraft before an emergency has occurred, leaving a keyed connector at the other end unconnected;

b) selecting a second DC breakout cable and connecting said cable to a battery in said receiver aircraft before an emergency has occurred, leaving a keyed connector at the other end unconnected; and c) after said receiver aircraft is stalled, the emergency rescue operation further comprising the steps of:

i) selecting a first DC cable and a DC coupling means each having two ends and first connecting one end of said DC coupling means to one end of said first DC cable and thereafter connecting the other of said first DC cable ends to said unconnected end of said donor aircraft breakout cable; and ii) selecting a second DC cable having two ends and first connecting one end of said second DC cable to said unconnected receiver aircraft breakout cable and thereafter connecting the other of said second DC cable ends to the other of said DC coupling means ends.

12. A method of interconnecting the DC electrical systems of two aircraft in an emergency aircraft start operation, where a donor aircraft rescues a stalled receiver aircraft, comprising the steps of:

a) selecting a first DC breakout cable and connecting said cable to a battery in said donor aircraft before an emergency has occurred, leaving a keyed connector at the other end unconnected;

b) selecting a second DC breakout cable and connecting said cable to a battery in said receiver aircraft before an emergency has occurred, leaving a keyed connector at the other end unconnected; and c) after said receiver aircraft is stalled, the emergency rescue operation further comprising the steps of:

i) selecting a first DC cable having two ends and connecting one end of said first DC cable to said unconnected end of said receiver aircraft breakout cable;

ii) selecting a DC coupling having two ends and connecting one of said coupling ends to the other of said first DC cable ends;

iii) selecting a second DC cable having two ends and first connecting one of said ends to the other of said coupling ends and thereafter connecting the other of said DC cable ends to said donor aircraft breakout cable connector.

* * * * *